(12) United States Patent
An et al.

(10) Patent No.: US 12,181,298 B2
(45) Date of Patent: Dec. 31, 2024

(54) USER TERMINAL AND CONTROL METHOD THEREOF

(71) Applicants: Hyundai Motor Company, Seoul (KR); Kia Corporation, Seoul (KR)

(72) Inventors: Rowoon An, Seoul (KR); Jae Yul Woo, Seoul (KR); Seunghyun Woo, Seoul (KR); Soobin Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 241 days.

(21) Appl. No.: 17/860,302

(22) Filed: Jul. 8, 2022

(65) Prior Publication Data

US 2023/0108484 A1    Apr. 6, 2023

(30) Foreign Application Priority Data

Oct. 5, 2021  (KR) .......... 10-2021-0131789

(51) Int. Cl.
*G01C 21/34*    (2006.01)
*G01C 21/36*    (2006.01)
*G06Q 30/0251*  (2023.01)
*G06T 11/00*    (2006.01)
*G06V 20/20*    (2022.01)

(52) U.S. Cl.
CPC ..... *G01C 21/3476* (2013.01); *G01C 21/3647* (2013.01); *G01C 21/3682* (2013.01); *G06Q 30/0259* (2013.01); *G06Q 30/0267* (2013.01); *G06T 11/00* (2013.01); *G06V 20/20* (2022.01)

(58) Field of Classification Search
CPC ........... G01C 21/3476; G01C 21/3647; G06T 11/00; G06T 7/30; G06T 19/006; G06V 20/20; G06V 20/40; G06F 40/258; G06Q 30/0259; G06Q 30/0267; G06Q 30/02
See application file for complete search history.

(56) References Cited

U.S. PATENT DOCUMENTS

| | | | |
|---|---|---|---|
| 9,558,593 B2 * | 1/2017 | Tomita | G06F 16/00 |
| 2013/0093787 A1 * | 4/2013 | Fulks | G06T 11/60 |
| | | | 345/629 |
| 2015/0369612 A1 | 12/2015 | Nishimura et al. | |

(Continued)

FOREIGN PATENT DOCUMENTS

| | | | | |
|---|---|---|---|---|
| EP | 3143782 B1 * | 11/2019 | ......... | G01C 21/3484 |
| JP | 6459712 B2 | 1/2019 | | |

(Continued)

*Primary Examiner* — Said Broome
*Assistant Examiner* — Donna J. Ricks
(74) *Attorney, Agent, or Firm* — Slater Matsil, LLP

(57) ABSTRACT

An embodiment user terminal includes an image acquisition part, a user interface configured to display an image photographed through the image acquisition part, a position detection sensor configured to detect a position of the user terminal, and a controller configured to determine a recommended point of interest (POI) among a plurality of POIs located around the user terminal, based on operation information about each of the plurality of POIs, a user's search history for a POI, and the user's POI scrap, and to control the user interface to display an augmented reality (AR) image corresponding to the recommended POI by superimposing the AR image on the image photographed through the image acquisition part.

20 Claims, 12 Drawing Sheets

(56) References Cited

U.S. PATENT DOCUMENTS

| | | | | |
|---|---|---|---|---|
| 2016/0337275 A1* | 11/2016 | Hong | ............... | H04L 51/222 |
| 2017/0268886 A1* | 9/2017 | Tang | ............... | H04L 51/222 |
| 2020/0264007 A1* | 8/2020 | Yoo | ............... | G06T 19/006 |
| 2020/0309557 A1* | 10/2020 | Efland | ............... | G06V 20/20 |
| 2021/0095989 A1 | 4/2021 | Matlack et al. | | |
| 2021/0294867 A1* | 9/2021 | Sahadi | ............... | G06F 16/9535 |
| 2022/0164830 A1* | 5/2022 | Kang | ............... | H04W 4/022 |
| 2022/0397411 A1* | 12/2022 | Brown | ............... | G01C 21/3476 |

FOREIGN PATENT DOCUMENTS

| | | |
|---|---|---|
| KR | 20070029322 A | 3/2007 |
| KR | 20160056638 A | 5/2016 |
| KR | 20210069282 A | 6/2021 |

\* cited by examiner

USER TERMINAL AND CONTROL METHOD THEREOF

CROSS-REFERENCE TO RELATED APPLICATIONS

This application claims the benefit of Korean Patent Application No. 10-2021-0131789, filed on Oct. 5, 2021, which application is hereby incorporated herein by reference.

TECHNICAL FIELD

The disclosure relates to a user terminal that provides augmented reality and a control method thereof.

BACKGROUND

Recently, services using augmented reality (AR) are increasing. A user may be provided with a livelier service than before through an AR service by using a user terminal.

For example, a map and navigation service using an AR technology may display an AR image of a point of interest (POI) related to various types of businesses such as a restaurant, a café, a grocery store, etc., at the location of the corresponding POI. That is, when a user photographs a POI using a user terminal, an AR image of the POI which is superimposed on the photographed image may be displayed at the location of the POI.

SUMMARY

An embodiment of the disclosure provides a user terminal and a control method thereof that may provide an optimal point of interest (POI) for a user, as an augmented reality (AR) image, based on a POI that the user has searched for, a POI that the user has saved, and operation information of each POI located around the user terminal.

Additional embodiments of the disclosure will be set forth in part in the description which follows and, in part, will be obvious from the description, or may be learned by practice of the disclosure.

According to an embodiment of the disclosure, there is provided a user terminal including an image acquisition part, a user interface configured to display an image photographed through the image acquisition part, a position detection sensor configured to detect a position of the user terminal, and a controller configured to determine a recommended point of interest (POI) among a plurality of POIs located around the user terminal, based on operation information about each of the plurality of POIs, a user's search history for a POI, and the user's POI scrap, and control the user interface to display an augmented reality (AR) image corresponding to the recommended POI by superimposing the AR image on the image photographed through the image acquisition part.

The controller is configured to determine a preferred category based on the user's search history for the POI and the user's POI scrap, and determine POIs corresponding to the preferred category among the plurality of POIs as the recommended POI.

The controller is configured to extract a keyword through text extraction or image processing for review information about each of the POIs corresponding to the preferred category, and determine the recommended POI among the POIs corresponding to the preferred category based on the user's POI scrap and the extracted keyword.

The controller is configured to determine a recommended route based on an another user's route to the recommended POI, and control the user interface to display an AR image corresponding to the recommended route by superimposing the AR image on the image photographed through the image acquisition part, the another user's route being stored in a database of an external server.

When the user terminal moves along the recommended route, the controller is configured to control the user interface to display an AR post, stored by an another user on the recommended route, by superimposing the AR post on the image photographed through the image acquisition part.

When the user terminal moves along the recommended route, the controller is configured to control to output a voice file stored by another user on the recommended route.

The controller is configured to determine whether a change where the recommended POI becomes unavailable occurs based on real-time operation information of the recommended POI while the user terminal moves to the recommended POI, and when the recommended POI becomes unavailable, determine another recommended POI located around the recommended POI.

When coupon information about the recommended POI is received from an external server, the controller is configured to control the user interface to display an AR image corresponding to the coupon information by superimposing the AR image on the image photographed through the image acquisition part.

When coupon information about a first POI located around the user terminal is received from an external server, the controller is configured to check a history of visiting the first POI, and when the history of visiting the first POI exists, store the coupon information about the first POI.

The controller is configured to control the user interface to display the coupon information about the first POI, when the user terminal is located within a predetermined distance from the first POI.

According to an embodiment of the disclosure, there is provided a control method of a user terminal including an image acquisition part and a user interface configured to display an image photographed through the image acquisition part. The control method includes determining a recommended POI among a plurality of POIs located around the user terminal, based on operation information about each of the plurality of POIs, a user's search history for a POI, and the user's POI scrap, and controlling the user interface to display an AR image corresponding to the recommended POI by superimposing the AR image on the image photographed through the image acquisition part.

The determining of the recommended POI includes determining a preferred category based on the user's search history for the POI and the user's POI scrap, and determining POIs corresponding to the preferred category among the plurality of POIs as the recommended POI.

The determining of the recommended POI includes extracting a keyword through text extraction or image processing for review information about each of the POIs corresponding to the preferred category, and determining the recommended POI among the POIs corresponding to the preferred category based on the user's POI scrap and the extracted keyword.

The control method further includes determining a recommended route based on another user's route to the recommended POI, the other user's route being stored in a database of an external server, and controlling the user interface to display an AR image corresponding to the recommended route by superimposing the AR image on the image photographed through the image acquisition part.

The control method further includes, when the user terminal moves along the recommended route, controlling the user interface to display an AR post, stored by an another user on the recommended route, by superimposing the AR post on the image photographed through the image acquisition part.

The control method further includes, when the user terminal moves along the recommended route, controlling to output a voice file stored by another user on the recommended route.

The control method further includes determining whether a change where the recommended POI becomes unavailable occurs based on real-time operation information of the recommended POI while the user terminal moves to the recommended POI, and when the recommended POI becomes unavailable, determining another recommended POI located around the recommended POI.

The control method further includes, when coupon information about the recommended POI is received from an external server, controlling the user interface to display an AR image corresponding to the coupon information by superimposing the AR image on the image photographed through the image acquisition part.

The control method further includes, when coupon information about a first POI located around the user terminal is received from an external server, checking a history of visiting the first POI, and when the history of visiting the first POI exists, storing the coupon information about the first POI.

The control method further includes controlling the user interface to display the coupon information about the first POI, when the user terminal is located within a predetermined distance from the first POI.

BRIEF DESCRIPTION OF THE DRAWINGS

These and/or other embodiments of the disclosure will become apparent and more readily appreciated from the following description of the embodiments, taken in conjunction with the accompanying drawings, in which.

DETAILED DESCRIPTION OF ILLUSTRATIVE EMBODIMENTS

Figure 1:
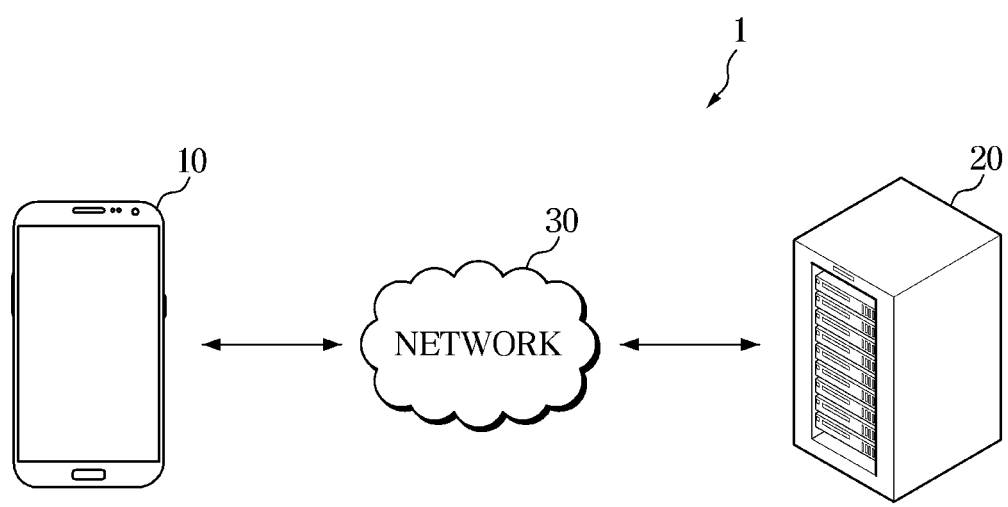
FIG. 1 illustrates a point of interest (POI) display system according to an embodiment.

Like reference numerals throughout the specification denote like elements. Also, this specification does not describe all the elements according to embodiments of the disclosure, and descriptions well-known in the art to which the disclosure pertains or overlapped portions are omitted.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of one or more other features, integers, steps, operations, elements, components, and/or groups thereof.

It is to be understood that the singular forms are intended to include the plural forms as well, unless the context clearly dictates otherwise.

The terms such as "-part", "-device", "-block", "-member", "-module", and the like may refer to a unit for processing at least one function or act. For example, the terms may refer to at least one process processed by at least one hardware, such as a field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, a user equipment (UE) (e.g., a user terminal) and a control method thereof according to embodiments of the disclosure will be described in detail with reference to the accompanying drawings.

FIG. 1 illustrates a point of interest (POI) display system according to an embodiment.

Referring to FIG. 1, the POI display system 1 includes a UE 10, a server 20 and a network 30. The UE 10 displays an augmented reality (AR) image of a POI, and the server 20 stores identification information for each POI, a user's route to a POI, and the like. The network 30 provides communication between the UE 10 and the server 20.

In this instance, the POI may correspond to stores of various types of businesses such as restaurants, cafes, and grocery stores. However, a type of POI is not limited to a store, as long as it corresponds to a place such as a tourist destination, a public office, and the like.

Also, the identification information is information for identifying a POI, and may include location information of the POI, an AR image of the POI, operation information of the POI such as a name of a store, advertising (a logo, a signboard, etc.), an address, opening hours, a telephone number, a congestion level, user ratings (review information), and the like.

In addition, the user's route to the POI may be information about a route that may be stored when a user of the UE 10 using the POI display system 1 moves to the POI.

According to an embodiment, the UE 10 is an electronic device including an image acquisition part and a display module capable of displaying an image photographed through the image acquisition part, such as a smartphone, a navigation device in a vehicle, etc. A type of the UE 10 is not limited.

According to an embodiment, the UE 10 may provide an optimal POI for the user as an AR image, based on a POI list that the user of the UE 10 has searched for, a POI scrap list that the user has saved, and operation information of each of the POIs located around the UE 10.

That is, the UE 10 may identify at least one POI located within a predetermined distance from the UE 10 based on location information of the UE 10 and identification information of the POI. Also, the UE 10 may determine a POI most likely to be preferred by the user among the at least one POI, as a recommended POI, based on a search history of the user for the POI and a POI scrap saved by the user for the POI, and provide the recommended POI as an AR image. Determining and providing the recommended POI will be described in detail later.

According to an embodiment, the server 20 may provide the identification information for each POI and the operation information for each POI to the UE 10. Also, the server 20 may receive information about a route to a POI from the UE 10, and store the received information in a corresponding database.

The POI display system 1 has been described above. Hereinafter, a configuration of the UE 10 is described in detail.

Figure 2:
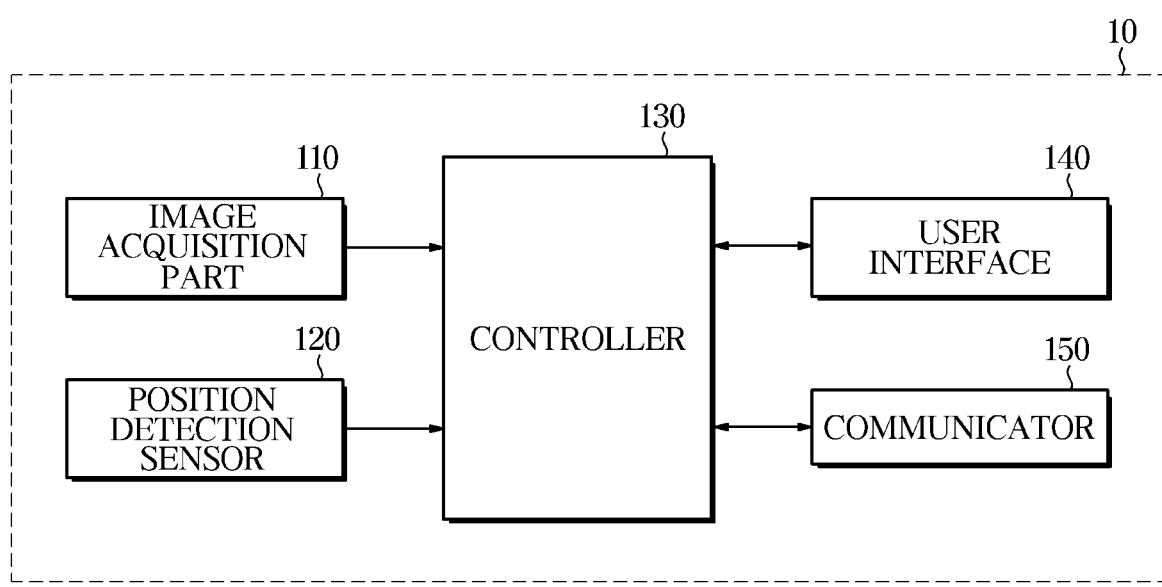
FIG. 2 is a control block diagram illustrating a user equipment (UE) (e.g., a user terminal) according to an embodiment.

FIG. 2 is a control block diagram illustrating the UE 10 according to an embodiment.

Referring to FIG. 2, according to an embodiment, the UE 10 includes an image acquisition part 110, a position detection sensor 120, a controller 130, a user interface 140 and a communicator 150. The controller 130 determines a recommended POI and controls to display an AR image corresponding to the determined recommended POI. The user interface 140 displays an image photographed through the image acquisition part 110 and receives a user input. The communicator 150 performs communication with the server 20.

According to an embodiment, the image acquisition part 110 may be provided on a front and/or rear of the UE 10 to acquire an image. The image acquisition part 110 may be provided as a known type of image sensor, and a type thereof is not limited. For example, the image acquisition part 110 may correspond to a camera.

According to an embodiment, the position detection sensor 120 may detect a position of the UE 10, and for example, may determine the position of the UE 10 by receiving a global positioning system (GPS) signal. Also, the position detection sensor 120 may detect a direction, inclination, etc., of the UE 10 to detect a shooting direction of the image acquisition part 110.

According to an embodiment, the controller 130 may determine the recommended POI among a plurality of POIs located around the UE 10, based on operation information of each of the plurality of POIs, a user's search history for a POI, and the user's POI scrap. Also, the controller 130 may control the user interface 140 to display an AR image corresponding to the recommended POI by superimposing the AR image on the image photographed through the image acquisition part 110. Determining and displaying the recommended POI will be described in detail later.

According to an embodiment, the controller 130 may determine a recommended route based on another user's route to the recommended POI, and control the user interface 140 to display an AR image corresponding to the recommended route by superimposing the AR image on the image photographed through the image acquisition part 110. Here, the other user's route to the recommended POI is received from the server 20.

According to an embodiment, when the UE 10 moves along the recommended route, the controller 130 may control the user interface 140 to display an AR post, stored by another user on the recommended route, by superimposing the AR post on the image photographed through the image acquisition part 110.

Also, according to embodiments, when the UE 10 moves along the recommended route, the controller 130 may control the user interface 140 to output a voice file stored by another user on the recommended route.

According to an embodiment, the controller 130 may determine whether a change where the recommended POI becomes unavailable occurs based on real-time operation information of the recommended POI, while the UE 10 moves to the recommended POI. When the recommended POI becomes unavailable, the controller 130 may determine another recommended POI located around the recommended POI.

According to an embodiment, when coupon information about the recommended POI is received from the server 20, the controller 130 may control the user interface 140 to display an AR image corresponding to the coupon information by superimposing the AR image on the image photographed through the image acquisition part 110.

According to an embodiment, when coupon information about a first POI located around the UE 10 is received from the server 20, the controller 130 may check a history of visiting the first POI, and when the history of visiting the first POI exists, store the coupon information about the first POI.

Also, according to embodiments, when the UE 10 is located within a predetermined distance from the first POI, the controller 130 may control the user interface 140 to display the coupon information about the first POI.

The controller 130 may include at least one memory storing a program for performing the aforementioned operations and operations described below, and at least one processor for implementing a stored program. When a plurality of memories and processors are provided, the plurality of memories and processors may be integrated into one chip or provided in physically separated locations.

According to an embodiment, the user interface 140 may include a display module provided on the front of the UE 10 to display the image photographed through the image acquisition part 110, and an input part that receives a user input. The display module may be provided as a known type of display module, and may be implemented as a touch screen provided integrally with the input part. Also, according to embodiments, the user interface 140 may include a speaker for outputting a sound signal.

According to an embodiment, the communicator 150 may communicate with the server 20, receive identification information for each POI, operation information for each POI, and information about a route to a POI, from the server 20, and transmit the information about the route to the POI. The communicator 150 may be provided as a known type of wireless communication module.

The configuration of the UE 10 has been described above. Hereinafter, the UE 10 determining the recommended POI and providing the user with the recommended POI as an AR image is described in detail.

Figure 3:
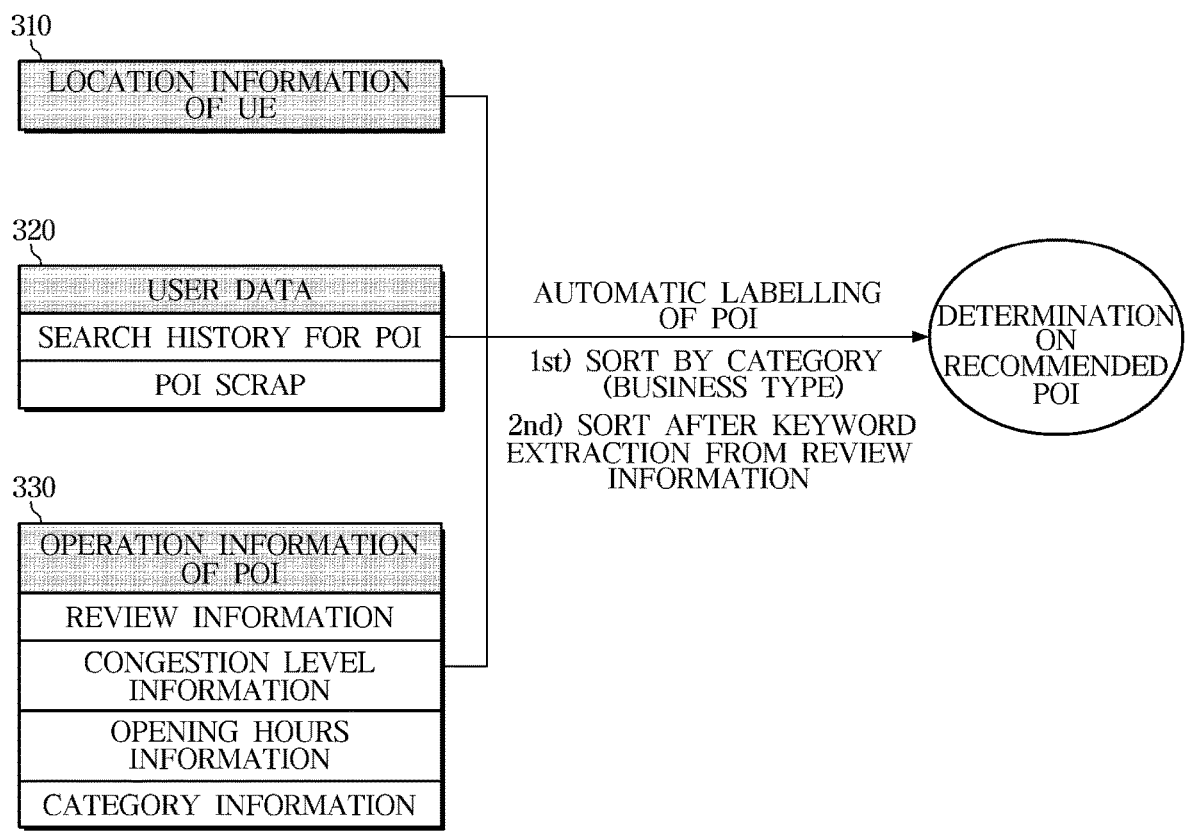
FIG. 3 is a diagram illustrating an example where a UE determines a recommended POI according to an embodiment.

FIG. 3 is a diagram illustrating an example where the UE 10 determines a recommended POI according to an embodiment.

Referring to FIG. 3, according to an embodiment, the UE 10 may determine a recommended POI based on location information 310 of the UE 10, user data 320 and operation information 330 of a POI.

That is, the UE 10 may determine the recommended POI among a plurality of POIs located around the UE 10, based on operation information of each of the plurality of POIs, a user's search history for a POI, and the user's POI scrap.

Specifically, the UE 10 may identify the plurality of POIs located within a predetermined distance from the UE 10 based on the location information 310 of the UE 10. In this instance, the UE 10 may determine the plurality of POIs based on identification information for each POI received from the server 20. As described above, the server 20 may store the identification information (including location information) for each POI.

The UE 10 may determine the recommended POI among the plurality of POIs, based on the user data 320 and the operation information 330 of each of the plurality of POIs.

The UE 10 may extract a keyword and a category (business type) of a POI preferred by a user, based on the user's search history for a POI and the user's POI scrap which are included in the user data 320.

That is, the UE 10 may determine a preferred category based on the user's search history for a POI and the user's POI scrap.

For example, the UE 10 may determine a category of a POI frequently searched for by the user or a category of a saved POI as the preferred category. Also, the UE 10 may determine a preferred keyword by extracting a keyword from the POI previously saved by the user. In this instance, the user's POI scrap refers to information about the POI preferred by the user, and the information being saved in a separate storage space (e.g., a scrap list). Also, the user's POI scrap may include reviews (images, texts, etc.) for the corresponding POI. That is, the UE 10 may determine a keyword (e.g., animals, kindness, quiet, etc.) through text extraction or image processing with respect to the information about the saved POI.

The UE 10 may determine a POI corresponding to the preferred category as the recommended POI, based on the operation information for each of the plurality of POIs.

Also, the UE 10 may extract the keyword through text extraction or image processing with respect to review information of each of the POIs corresponding to the preferred category, and determine the recommended POI among the POIs corresponding to the preferred category, based on the user's POI scrap and the extracted keyword. In this instance, the review information may correspond to a review written by another user for the corresponding POI, and may be stored in a form of text or image.

Figure 4:
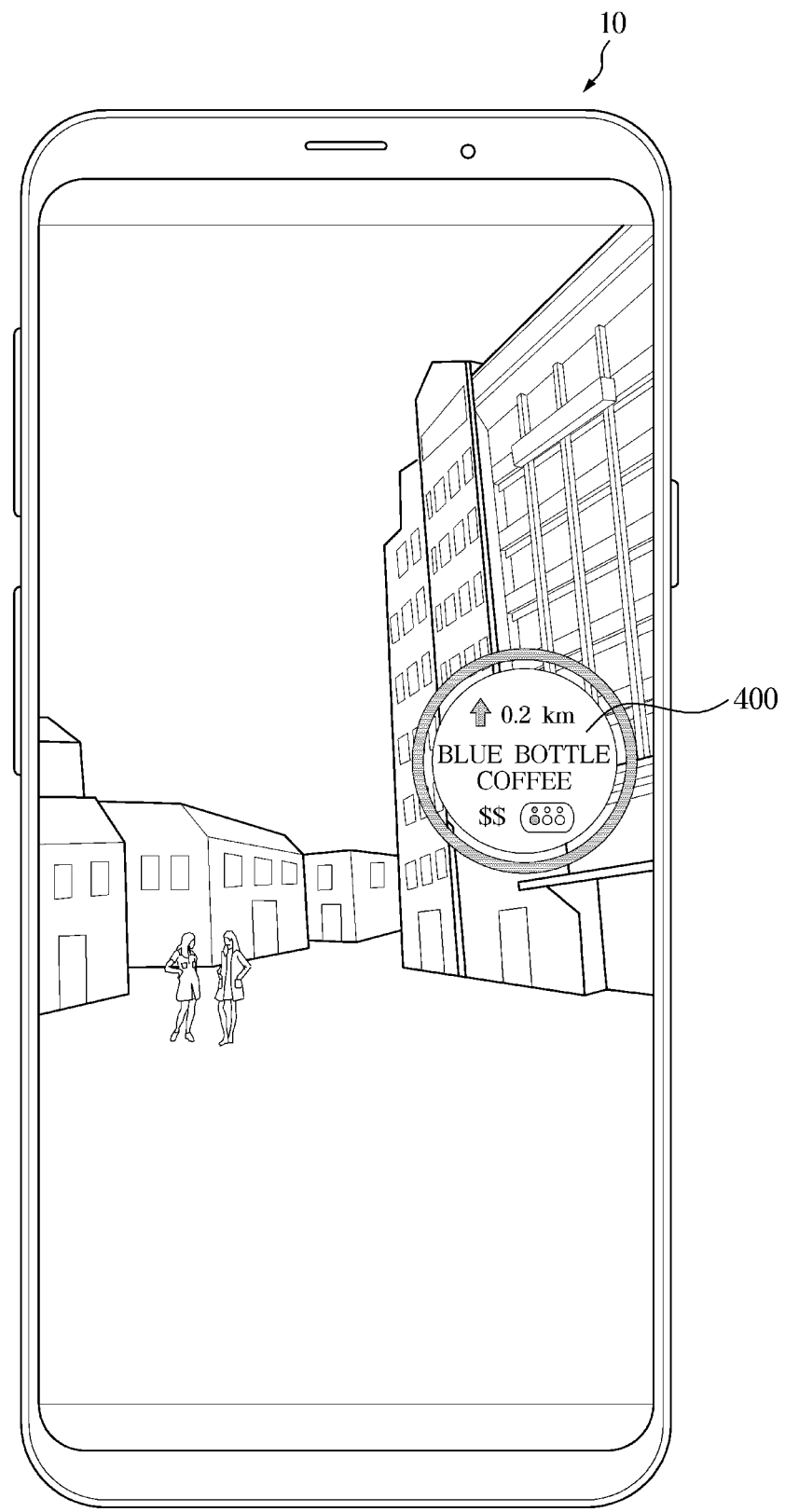
FIG. 4 is a diagram illustrating an example where a UE displays an augmented reality (AR) image corresponding to a recommended POI according to an embodiment.

FIG. 4 is a diagram illustrating an example where the UE 10 displays an AR image corresponding to a recommended POI according to an embodiment.

Referring to FIG. 4, according to an embodiment, when a recommended POI is determined, the UE 10 may display an AR image 400 corresponding to the recommended POI by superimposing the AR image on an image photographed through the image acquisition part 110.

In this instance, the AR image 400 corresponding to the recommended POI may be displayed in an area where the recommended POI is located in the image photographed through the image acquisition part 110.

The AR image 400 corresponding to the recommended POI may include information used to identify the recommended POI, such as a name, congestion level, opening hours, remaining distance, and the like, of a store which is the recommended POI. Any information that may be used to identify the recommended POI may be included in the AR image 400 corresponding to the recommended POI.

Figure 5:
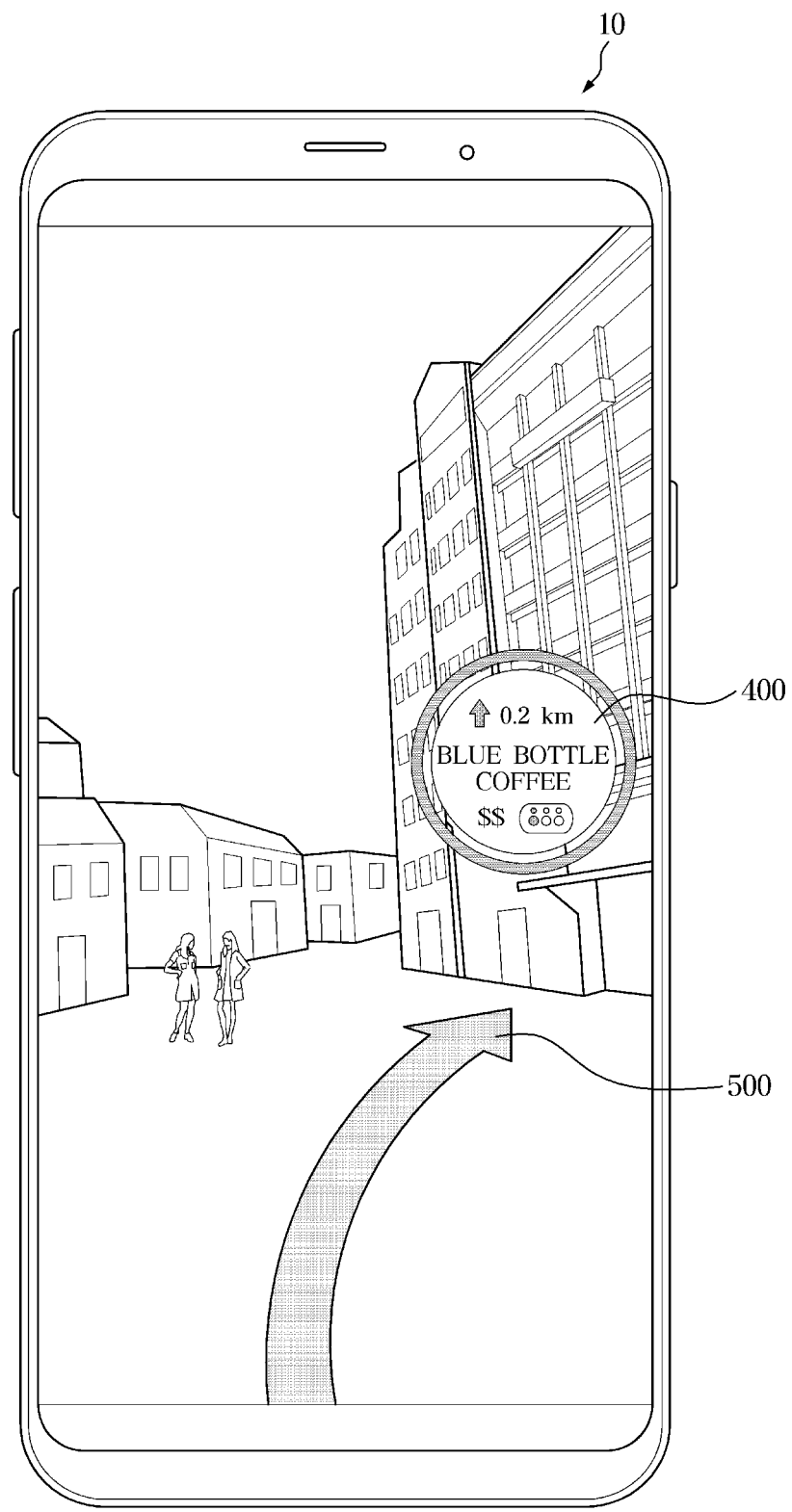
FIG. 5 is a diagram illustrating an example where a UE displays an AR image about a recommended route according to an embodiment.
Figure 6:
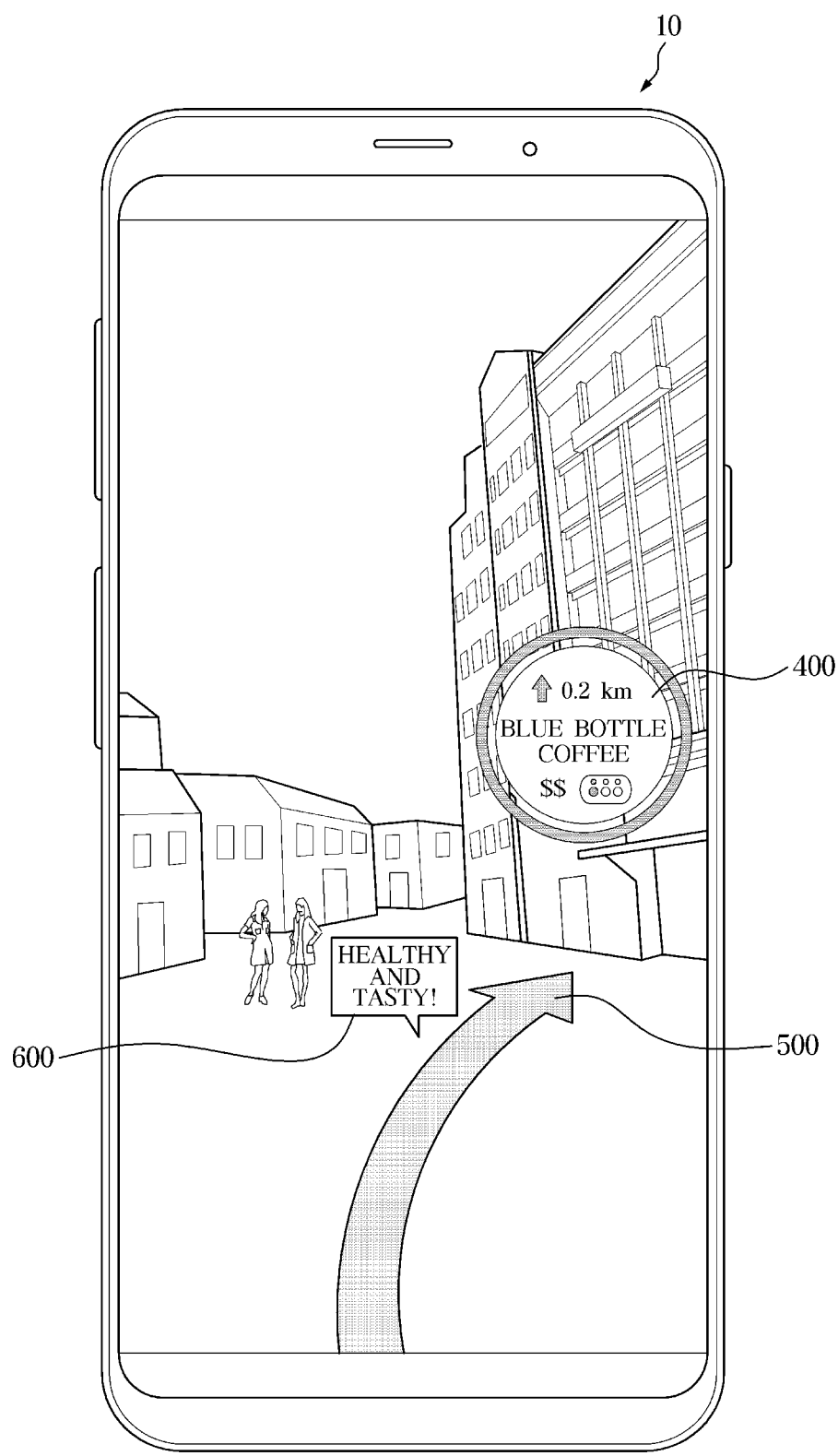
FIG. 6 is a diagram illustrating an example where a UE displays a post on a recommended route according to an embodiment.

FIG. 5 is a diagram illustrating an example where the UE 10 displays an AR image about a recommended route according to an embodiment. FIG. 6 is a diagram illustrating an example where the UE 10 displays a post on a recommended route according to an embodiment.

Referring to FIG. 5, according to an embodiment, the UE 10 may determine a recommended route based on another user's route to the recommended POI, and control the user interface 140 to display an AR image 500 corresponding to the recommended route by superimposing the AR image 500 on an image photographed through the image acquisition part 110. Here, the other user's route to the recommended POI is received from the server 20.

Specifically, the UE 10 may determine, as the recommended route, a route of the other user who has moved from a location of the UE 10 to the recommended POI, based on location information of the UE 10 and the other user's route to the recommended POI received from the server 20.

Also, according to embodiments, as shown in FIG. 6, the UE 10 may control the user interface 140 to display an AR post 600, stored by another user on the recommended route, by superimposing the AR post 600 on the image photographed through the image acquisition part 110.

The AR post 600 is review information in a form of an AR image stored by the other user on a specific location on the recommended route, and may be provided to the UE 10 by the server 20. That is, the AR post 600 may include location information. When a location indicated by the location information is photographed through the image acquisition part 110, the AR post 600 may be displayed on a corresponding position on the photographed image.

Also, according to embodiments, when the UE 10 moves along the recommended route, the UE 10 may control the user interface 140 to output a voice file stored by another user on the recommended route.

The voice file is review information in a voice form stored by another user on a specific location on the recommended route, and may be provided to the UE 10 by the server 20. That is, the voice file may include location information. When the UE 10 approaches a location indicated by the location information, the voice file may be reproduced by the UE 10.

Figure 7:
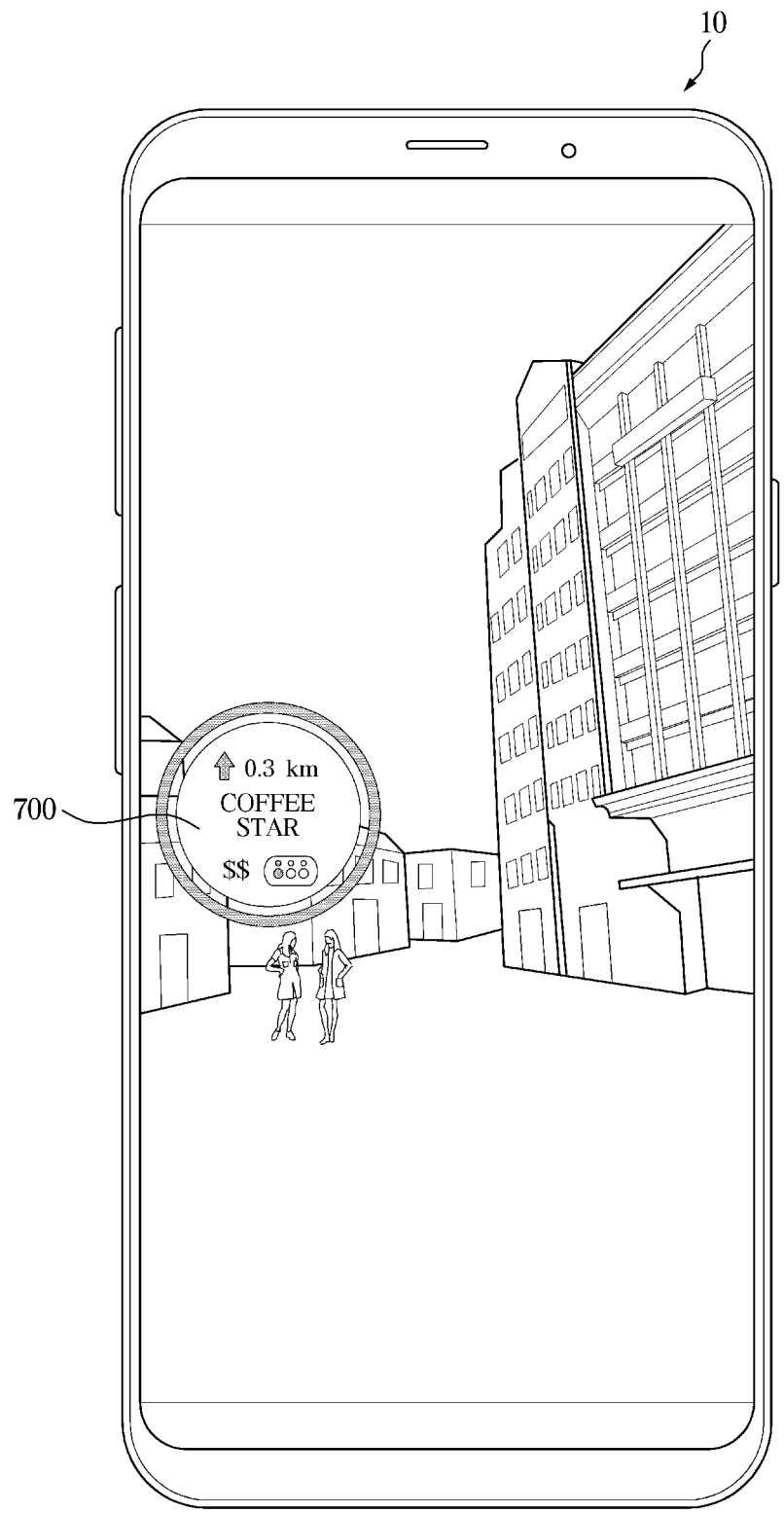
FIG. 7 is a diagram illustrating an example where a UE recommends another recommended POI according to an embodiment.

FIG. 7 is a diagram illustrating an example where the UE 10 recommends another recommended POI according to an embodiment.

Referring to FIG. 7, according to an embodiment, the UE 10 may determine whether a change where a recommended POI becomes unavailable occurs based on real-time operation information of the recommended POI, while the UE 10 moves to the recommended POI. When the recommended POI becomes unavailable, the UE 10 may determine another recommended POI located around the recommended POI, and display an AR image 700 corresponding to the other recommended POI.

Specifically, when the recommended POI becomes unavailable due to a high congestion level, the UE 10 may determine the other recommended POI located within a predetermined distance from the recommended POI. In this instance, the other recommended POI may also be determined in the same process as determining the recommended POI as described above.

For example, when the recommended POI is a parking lot and the parking becomes full, the UE 10 may update the recommended POI with another parking lot located within a predetermined distance from the recommended POI.

Figure 8:
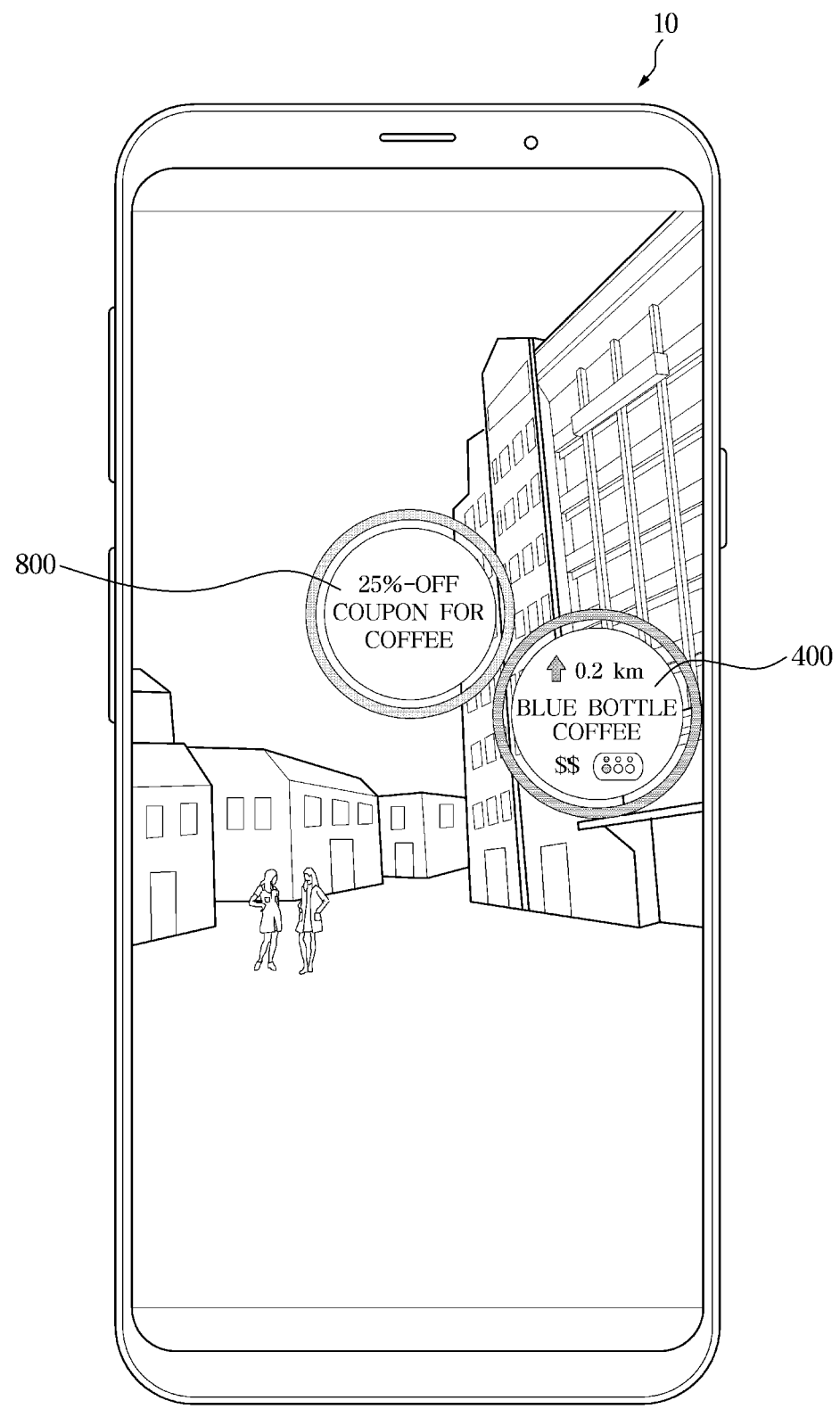
FIG. 8 is a diagram illustrating an example where a UE displays an AR image corresponding to coupon information according to an embodiment.

FIG. 8 is a diagram illustrating an example where the UE 10 displays an AR image corresponding to coupon information according to an embodiment.

Referring to FIG. 8, according to an embodiment, when coupon information about a recommended POI is received from the server 20, the UE 10 may display an AR image 800 corresponding to the coupon information by superimposing the AR image 800 on an image photographed through the image acquisition part 110.

Also, according to embodiments, when coupon information about a first POI located around the UE 10 is received from the server 20, the UE 10 may check a history of visiting the first POI, and when the history of visiting the first POI exists, store the coupon information about the first POI.

In addition, according to embodiments, when the UE 10 is located within a predetermined distance from the first POI, the UE 10 may control the user interface 140 to display the coupon information about the first POI.

Hereinafter, an embodiment of a control method of the UE 10 according to an embodiment of the disclosure is described. The UE 10 according to the above-described embodiments may be used for the control method of the UE 10. Accordingly, the description with reference to FIGS. 1 to 8 may be equally applied to the control method of the UE 10.

Figure 9:
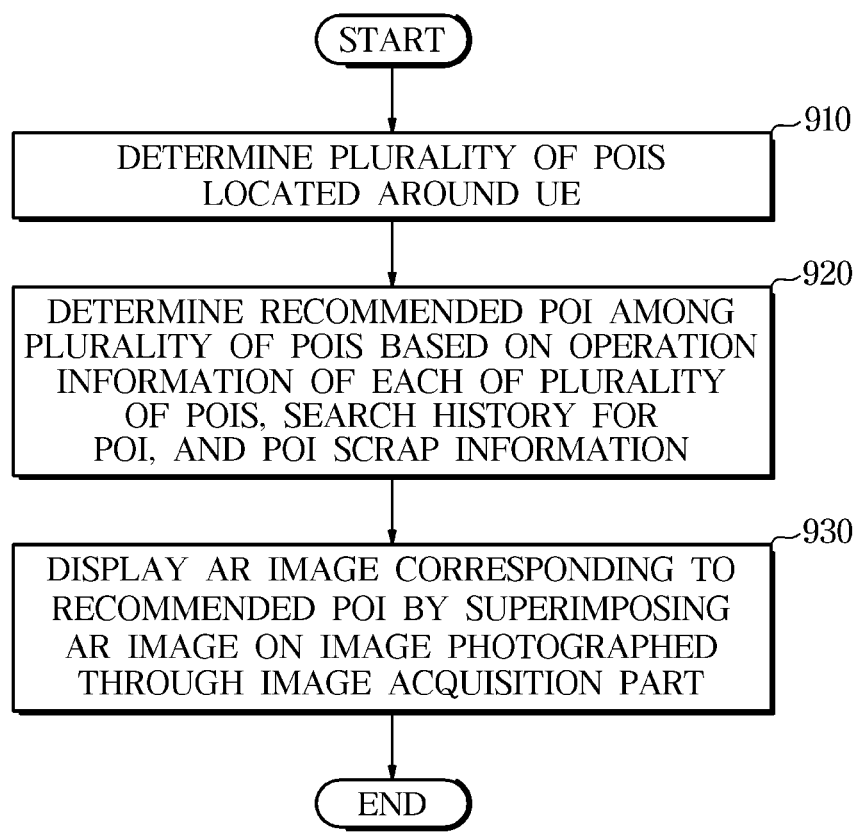
FIG. 9 is a flowchart illustrating operations of displaying a recommended POI in a control method of a UE according to an embodiment.

FIG. 9 is a flowchart illustrating operations of displaying a recommended POI in a control method of the UE 10 according to an embodiment.

Referring to FIG. 9, according to an embodiment, the UE 10 may determine a plurality of POIs located around the UE 10 (910). That is, the UE 10 may determine the plurality of POIs located within a predetermined distance from the UE 10 based on location information of the UE 10. In this instance, the UE 10 may identify a location of each of the POIs based on identification information for each POI received from the server 20.

According to an embodiment, the UE 10 may determine a recommended POI among the plurality of POIs based on operation information of each of the plurality of POIs, a search history for the POI, and POI scrap information (920).

That is, the UE 10 may determine a preferred category based on a user's search history for the POI and the user's POI scrap for the POI.

The UE 10 may determine a POI corresponding to the preferred category as the recommended POI, based on the operation information of each of the plurality of POIs.

Also, the UE 10 may extract a keyword through text extraction or image processing with respect to review information of each of the POIs corresponding to the preferred category, and determine the recommended POI among the POIs corresponding to the preferred category, based on the user's POI scrap and the extracted keyword.

According to an embodiment, the UE 10 may display an AR image corresponding to the recommended POI by superimposing the AR image on an image photographed through the image acquisition part 110 (930).

Figure 10:
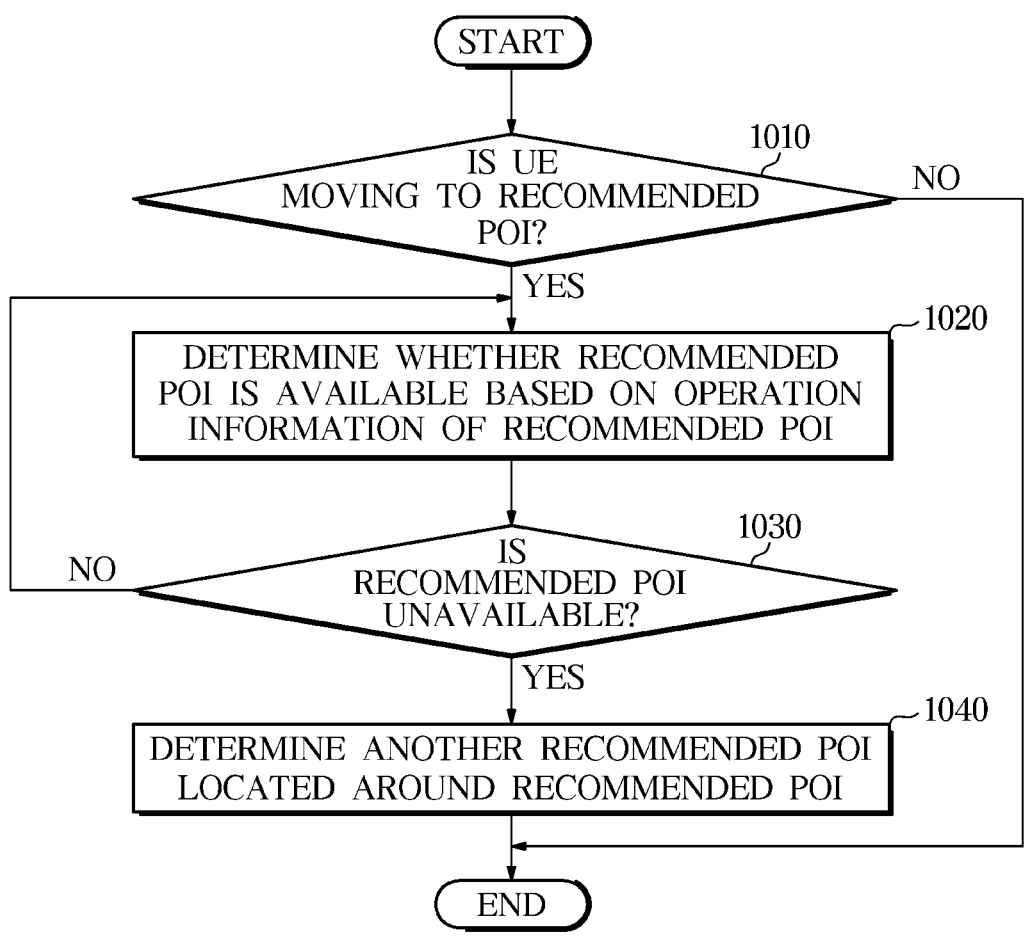
FIG. 10 is a flowchart illustrating operations of changing a recommended POI in a control method of a UE according to an embodiment.

FIG. 10 is a flowchart illustrating operations of changing a recommended POI in a control method of the UE 10 according to an embodiment.

Referring to FIG. 10, according to an embodiment, while the UE 10 moves to a recommended POI (Yes in operation 1010), the UE 10 may determine whether the recommended POI is available based on operation information of the recommended POI (1020).

In this instance, when the recommended POI is unavailable (Yes in operation 1030), the UE 10 may determine another recommended POI located around the recommended POI (1040).

Specifically, when the recommended POI becomes unavailable due to a high congestion level, the UE 10 may determine the other recommended POI located within a predetermined distance from the recommended POI. In this instance, the other recommended POI may also be determined in the same process as determining the recommended POI as described above.

Figure 11:
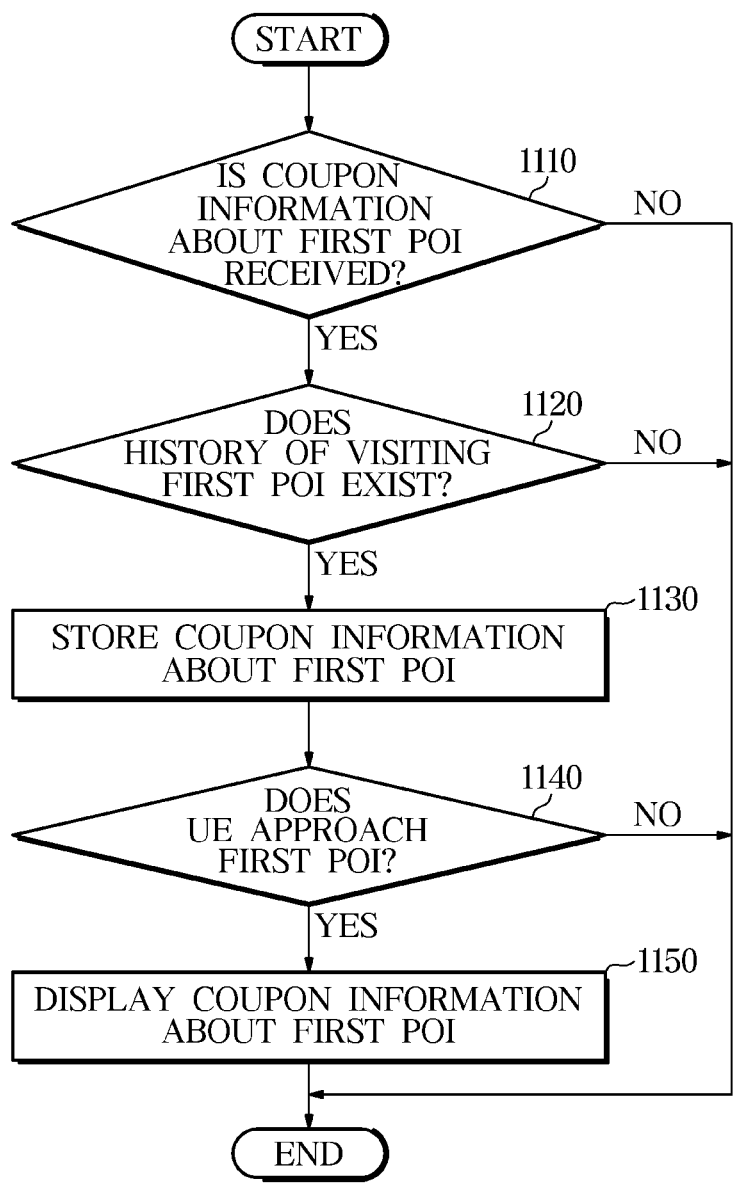
FIG. 11 is a flowchart illustrating operations of displaying coupon information in a control method of a UE according to an embodiment.

FIG. 11 is a flowchart illustrating operations of displaying coupon information in a control method of the UE 10 according to an embodiment.

Referring to FIG. 11, according to an embodiment, when coupon information about a first POI is received (Yes in operation 1110), and when a history of visiting the first POI exists (Yes in operation 1120), the UE 10 may store the coupon information about the first POI (1130).

Also, when the UE 10 approaches the first POI (Yes in operation 1140), the UE 10 may display the coupon information about the first POI (1150).

Figure 12:
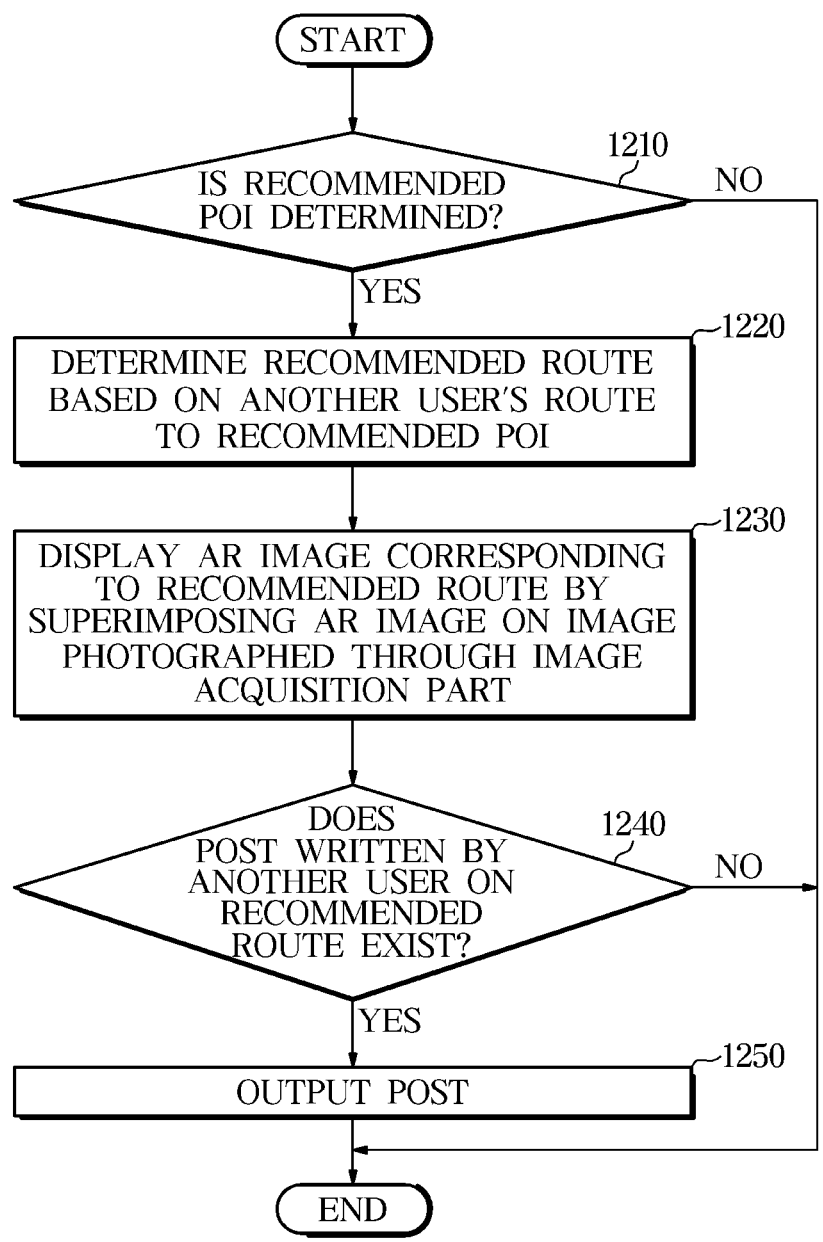
FIG. 12 is a flowchart illustrating operations of displaying a recommended route in a control method of a UE according to an embodiment.

FIG. 12 is a flowchart illustrating operations of displaying a recommended route in a control method of the UE 10 according to an embodiment.

Referring to FIG. 12, according to an embodiment, when a recommended POI is determined (Yes in operation 1210), the UE 10 may determine a recommended route based on another user's route to the recommended POI (1220).

Specifically, the UE 10 may determine a route of the other user who has moved from a location of the UE 10 to the recommended POI as the recommended route, based on location information of the UE 10 and the other user's route to the recommended POI received from the server 20.

Also, the UE 10 may display an AR image corresponding to the recommended route, by superimposing the AR image on an image photographed through the image acquisition part 110 (1230).

Also, when a post written by another user on the recommended route exists (Yes in operation 1240), the UE 10 may output the post (1250).

For example, the UE 10 may determine the recommended route based on the other user's route to the recommended POI received from the server 20, and control the user interface 140 to display the AR image 500 corresponding to the recommended route by superimposing the AR image 500 on the image photographed through the image acquisition part 110.

Also, when moving along the recommended route, the UE 10 may control the user interface 140 to output a voice file stored by another user on the recommended route.

As is apparent from the above, according to the embodiments of the disclosure, the user terminal and the control method thereof can provide an optimal POI for a user, as an AR image, based on a POI that the user has searched for, a POI that the user has saved, and operation information of each POI located around the user terminal, thereby automatically recommending a POI without user intervention and improving user convenience.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording mediums.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A user terminal comprising:
   an image acquisition part;
   a user interface configured to display an image photographed through the image acquisition part;
   a position detection sensor configured to detect a position of the user terminal; and
   a controller configured to determine a recommended point of interest (POI) among a plurality of POIs located around the user terminal based on operation information about each of the plurality of POIs, a user's search history for a POI, and the user's POI scrap, and to control the user interface to display an augmented reality (AR) image corresponding to the recommended POI by superimposing the AR image on the image photographed through the image acquisition part;
   wherein the controller is configured to determine a recommended route based on a second user's route to the recommended POI, and to control the user interface to display an AR image corresponding to the recommended route by superimposing the AR image on the image photographed through the image acquisition part, the second user's route being stored in a database of an external server; and
   wherein, when the user terminal moves along the recommended route, the controller is configured to control the user interface to display an AR post, stored by a third user on the recommended route, by superimposing the AR post on the image photographed through the image acquisition part.

2. The user terminal of claim 1, wherein the controller is configured to determine a preferred category based on the user's search history for the POI and the user's POI scrap, and determine a POI corresponding to the preferred category among the plurality of POIs as the recommended POI.

3. The user terminal of claim 2, wherein the controller is configured to extract a keyword through text extraction or image processing for review information about each of the POIs corresponding to the preferred category, and determine the recommended POI among the POIs corresponding to the preferred category based on the user's POI scrap and the extracted keyword.

4. The user terminal of claim 2, wherein, when the user terminal moves along the recommended route, the controller is configured to control to output a voice file stored by the third user on the recommended route.

5. The user terminal of claim 2, wherein the controller is configured to determine whether a change occurs in which the recommended POI becomes unavailable based on real-time operation information of the recommended POI while the user terminal moves to the recommended POI, and when the recommended POI becomes unavailable, determine a second recommended POI located around the recommended POI.

6. The user terminal of claim 1, wherein, when the user terminal moves along the recommended route, the controller is configured to control to output a voice file stored by the third user on the recommended route.

7. The user terminal of claim 1, wherein the controller is configured to determine whether a change occurs in which the recommended POI becomes unavailable based on real-time operation information of the recommended POI while the user terminal moves to the recommended POI, and when the recommended POI becomes unavailable, determine a second recommended POI located around the recommended POI.

8. The user terminal of claim 1, wherein, when coupon information about the recommended POI is received from the external server, the controller is configured to control the user interface to display an AR image corresponding to the coupon information by superimposing the AR image on the image photographed through the image acquisition part.

9. The user terminal of claim 1, wherein, when coupon information about a first POI located around the user terminal is received from the external server, the controller is configured to check a history of visiting the first POI, and when the history of visiting the first POI exists, store the coupon information about the first POI.

10. The user terminal of claim 9, wherein the controller is configured to control the user interface to display the coupon information about the first POI, when the user terminal is located within a predetermined distance from the first POI.

11. A control method of a user terminal comprising an image acquisition part and a user interface that displays an image photographed through the image acquisition part, the control method comprising:
   determining a recommended POI among a plurality of POIs located around the user terminal, based on operation information about each of the plurality of POIs, a user's search history for a POI, and the user's POI scrap;
   controlling the user interface to display an AR image corresponding to the recommended POI by superimposing the AR image on the image photographed through the image acquisition part;
   determining a recommended route based on a second user's route to the recommended POI, the second user's route being stored in a database of an external server;
   controlling the user interface to display an AR image corresponding to the recommended route by superimposing the AR image on the image photographed through the image acquisition part; and
   when the user terminal moves along the recommended route, controlling the user interface to display an AR post, stored by a third user on the recommended route, by superimposing the AR post on the image photographed through the image acquisition part.

12. The control method of claim 11, wherein determining the recommended POI comprises:
   determining a preferred category based on the user's search history for the POI and the user's POI scrap; and
   determining a POI corresponding to the preferred category among the plurality of POIs as the recommended POI.

13. The control method of claim 12, wherein determining the recommended POI comprises:

extracting a keyword through text extraction or image processing for review information about each of the POIs corresponding to the preferred category; and determining the recommended POI among the POIs corresponding to the preferred category based on the user's POI scrap and the extracted keyword.

14. The control method of claim 12, further comprising, when the user terminal moves along the recommended route, controlling to output a voice file stored by the third user on the recommended route.

15. The control method of claim 12, further comprising:

determining whether a change occurs in which the recommended POI becomes unavailable based on real-time operation information of the recommended POI while the user terminal moves to the recommended POI; and when the recommended POI becomes unavailable, determining a second recommended POI located around the recommended POI.

16. The control method of claim 11, further comprising, when the user terminal moves along the recommended route, controlling to output a voice file stored by the third user on the recommended route.

17. The control method of claim 11, further comprising:

determining whether a change occurs in which the recommended POI becomes unavailable based on real-time operation information of the recommended POI while the user terminal moves to the recommended POI; and when the recommended POI becomes unavailable, determining a second recommended POI located around the recommended POI.

18. The control method of claim 11, further comprising, when coupon information about the recommended POI is received from the external server, controlling the user interface to display an AR image corresponding to the coupon information by superimposing the AR image on the image photographed through the image acquisition part.

19. The control method of claim 11, further comprising:

when coupon information about a first POI located around the user terminal is received from the external server, checking a history of visiting the first POI; and when the history of visiting the first POI exists, storing the coupon information about the first POI.

20. The control method of claim 19, further comprising controlling the user interface to display the coupon information about the first POI, when the user terminal is located within a predetermined distance from the first POI.

* * * * *